Patented July 28, 1936

2,049,229

UNITED STATES PATENT OFFICE 2,049,229

VULCANIZATION OF RUBBER

Robert L. Sibley, Nitro, W. Va., assignor, by mesne assignments, to Monsanto Chemical Company, Wilmington, Del., a corporation of Delaware No Drawing. Application August 30, 1930, Serial No. 479,100

35 Claims. (Cl. 18—53)

The present invention relates to the vulcanization of rubber by an improved process wherein the products obtained by reacting a mercapto-aryl-thiazole, or an alkali salt thereof and the like with an aromatic acid halide are employed as vulcanization accelerators. It is well known among rubber chemists that mercapto-aryl-thiazoles constitute a group of vulcanization accelerators. It has now been found that by reacting a mercapto-aryl-thiazole, such for example, as the sodium salt of mercapto-benzo-thiazole with an aromatic acid halide, such for example as phthalyl chloride, benzoyl chloride and the like, there is formed an important class of compounds which may be employed alone as a vulcanization accelerator but preferably are employed in conjunction with a basic organic nitrogen containing vulcanization accelerator as an activator thereof, forming thereby a mixed accelerator possessing characteristic and highly desirable properties.

The invention will be fully understood from the following description and examples of preferred means of practicing the process claimed.

A rubber stock was compounded in the usual manner comprising 100 parts of pale crepe rubber, 5 parts zinc oxide, 3 parts of sulfur, and 1.0 part of the reaction product of phthalyl chloride and the sodium salt of mercapto-benzo-thiazole. Upon testing portions of the above described stock vulcanized by heating in a press for different periods of time under temperatures given by different steam pressures, the following tensile data were obtained.

Table I

| Cure mins. | Pressure lbs. steam | Modulus of elasticity in lbs./in.² at elongations of— | | | Tensile at break in lbs./in.² | Elongation at break, percent |
|---|---|---|---|---|---|---|
| | | 300% | 500% | 700% | | |
| 20 | 40 | 100 | 191 | 476 | 1455 | 920 |
| 30 | 40 | 147 | 244 | 629 | 1930 | 910 |
| 45 | 40 | 163 | 302 | 879 | 2050 | 870 |
| 60 | 40 | 146 | 292 | 800 | 2210 | 880 |

From the above results it is evident that a reaction product of an aromatic acid halide for example phthalyl chloride and a mercapto-aryl-thiazole, such for example as mercapto-benzo-thiazole possesses vulcanization accelerating properties. These accelerating properties are substantially increased when the preferred class of accelerators are activated by and employed in conjunction with a basic organic nitrogen containing vulcanization accelerator.

To show the improved action of this preferred class of accelerating compounds when employed in conjunction with a basic organic nitrogen containing accelerator as an activator thereof, a rubber stock was compounded in the usual manner comprising 100 parts of pale crepe rubber, 5 parts of zinc oxide, 3 parts of sulfur, 1 part of stearic acid, 0.4 part of the reaction product of phthalyl chloride and the sodium salt of mercapto-benzo-thiazole, designated as accelerator "A" in the following table, and 0.6 part of a basic organic nitrogen containing accelerator, as illustrated by those set forth in the table.

On testing strips of the above stock, vulcanized by heating in a press for different periods of time at different steam pressures, the following tensile data were obtained.

Table II

| Accelerating mixture | Cure mins. | Pressure lbs. steam | Modulus of elasticity in lbs./in.² at elongations of— | | Tensile at break in lbs./in.² | Elongation at break, percent |
|---|---|---|---|---|---|---|
| | | | 500 percent | 700 percent | | |
| Accelerator "A" Diphenyl-guanidine | 10 | 40 | 843 | 3480 | 4235 | 760 |
| Accelerator "A" Diortho tolyl guanidine | 10 | 40 | 858 | 3650 | 4245 | 740 |
| Accelerator "A" Hexamethylene tetramine | 10 | 40 | 560 | 2325 | 3480 | 775 |
| Accelerator "A" Thiocarbanilid | 10 | 40 | 180 | 561 | 1990 | 935 |
| Accelerator "A" Para phenylene diamine | 10 | 40 | 301 | 1028 | 2375 | 870 |
| Accelerator "A" Anhydro formaldehyde aniline | 10 | 40 | 218 | 740 | 2180 | 900 |

*Table II*—Continued

| Accelerating mixture | Cure mins. | Pressure lbs. steam | Modulus of elasticity in lbs./in.² at elongation of— | | Tensile at break in lbs./in.² | Elongation at break, percent |
|---|---|---|---|---|---|---|
| | | | 500 percent | 700 percent | | |
| Accelerator "A"<br>Diphenyl-guanidine | 20 | 40 | 1215 | 4475 | 4625 | 715 |
| Accelerator "A"<br>Diortho tolyl guanidine | 20 | 40 | 1333 | -------- | 4705 | 695 |
| Accelerator "A"<br>Hexamethylene tetramine | 20 | 40 | 885 | 3525 | 3920 | 740 |
| Accelerator "A"<br>Thiocarbanilid | 20 | 40 | 297 | 985 | 2655 | 880 |
| Accelerator "A"<br>Para phenylene diamine | 20 | 40 | 463 | 1750 | 3235 | 835 |
| Accelerator "A"<br>Anhydro formaldehyde aniline | 20 | 40 | 484 | 2000 | 3560 | 820 |
| Accelerator "A"<br>Diphenyl-guanidine | 30 | 40 | 1350 | -------- | 4400 | 680 |
| Accelerator "A"<br>Diortho tolyl guanidine | 30 | 40 | 1525 | -------- | 4330 | 675 |
| Accelerator "A"<br>Hexamethylene tetramine | 30 | 40 | 963 | 3790 | 4305 | 745 |
| Accelerator "A"<br>Thiocarbanilid | 30 | 40 | 359 | 1215 | 2800 | 845 |
| Accelerator "A"<br>Para phenylene diamine | 30 | 40 | 537 | 2140 | 3505 | 835 |
| Accelerator "A"<br>Anhydro formaldehyde aniline | 30 | 40 | 666 | 2680 | 3805 | 765 |
| Accelerator "A"<br>Diphenyl-guanidine | 45 | 40 | 1318 | -------- | 4395 | 680 |
| Accelerator "A"<br>Diortho tolyl guanidine | 45 | 40 | 1495 | -------- | 4460 | 675 |
| Accelerator "A"<br>Hexamethylene tetramine | 45 | 40 | 983 | 3895 | 4455 | 740 |
| Accelerator "A"<br>Thiocarbanilid | 45 | 40 | 405 | 1365 | 3145 | 850 |
| Accelerator "A"<br>Para phenylene diamine | 45 | 40 | 607 | 2235 | 3580 | 780 |
| Accelerator "A"<br>Anhydro formaldehyde aniline | 45 | 40 | 755 | 3035 | 4050 | 765 |
| Accelerator "A"<br>Diphenyl-guanidine | 60 | 40 | 1168 | 4365 | 4365 | 700 |
| Accelerator "A"<br>Diortho tolyl guanidine | 60 | 40 | 1370 | -------- | 4530 | 675 |
| Accelerator "A"<br>Hexamethylene tetramine | 60 | 40 | 925 | 3740 | 4120 | 730 |
| Accelerator "A"<br>Thiocarbanilid | 60 | 40 | 417 | 1393 | 3160 | 845 |
| Accelerator "A"<br>Para phenylene diamine | 60 | 40 | 638 | 2450 | 3630 | 775 |
| Accelerator "A"<br>Anhydro formaldehyde aniline | 60 | 40 | 745 | 3020 | 4100 | 765 |

From the data set forth in Table II, it is apparent that the preferred class of accelerating compounds are very desirable accelerators, particularly when activated by a basic organic nitrogen containing compound. Furthermore, their use is especially advantageous in that stocks in which they are incorporated prior to the vulcanization thereof maintain to a large extent their original tensile and modulus characteristics on over curing. Moreover, although the mixture is effective and fast even when employed at lower temperatures, it is not so fast in action as to produce prevulcanization or scorching of the stock during the milling, calendering or other handling operations.

As a further example of the use of the preferred class of compounds, the reaction product of substantially equi-molecular proportions of benzoyl chloride and mercapto-benzo-thiazole was incorporated in the well known manner in a rubber stock comprising

| | Parts |
|---|---|
| Pale crepe rubber | 100 |
| Zinc oxide | 5 |
| Sulfur | 3 |
| The reaction product of benzoyl chloride and mercapto-benzo-thiazole | 1 |

The above stock on vulcanizing by heating in a press for different periods of time at the temperature given by 40 pounds of steam pressure, per square inch, was found to possess the modulus and tensile characteristics set forth in Table III.

*Table III*

| Cure mins. | Pressure lbs. steam | Modulus of elasticity in lbs./in.² at elongations of— | | | Tensile at break in lbs./in.² | Elongation at break, percent |
|---|---|---|---|---|---|---|
| | | 300% | 500% | 700% | | |
| 10 | 40 | 88 | 134 | 324 | 1510 | 990 |
| 20 | 40 | 110 | 220 | 590 | 2075 | 920 |
| 30 | 40 | 127 | 243 | 694 | 2500 | 908 |
| 60 | 40 | 151 | 302 | 805 | 2440 | 868 |
| 90 | 40 | 147 | 287 | 808 | 2470 | 903 |

The data set forth in Table III shows that the reaction product of substantially equi-molecular proportions of benzoyl chloride and mercapto-benzo-thiazole possesses desirable accelerating properties. These said vulcanization accelerating properties are greatly improved however when the preferred accelerator is employed in conjunction with a basic organic nitrogen containing vulcanization accelerator as an activator thereof forming thereby a mixed accelerator. Thus a rubber stock was compounded in the usual manner on the mixing rolls comprising

| | Parts |
|---|---|
| Pale crepe rubber | 100 |
| Zinc oxide | 5 |
| Sulfur | 3 |
| The reaction product of benzoyl chloride and mercapto-benzo-thiazole | 0.4 |
| Diphenyl guanidine | 0.6 |

After vulcanizing the above described stock by heating in a press for different periods of time at the temperature given by 40 pounds of steam pressure per square inch the modulus and tensile data set forth in Table IV were obtained.

*Table IV*

| Cure mins. | Pressure lbs. steam | Modulus of elasticity in lbs./in.² at elongations of— | | | Tensile at break in lbs./in.² | Elongation at break, percent |
|---|---|---|---|---|---|---|
| | | 300% | 500% | 700% | | |
| 10 | 40 | 207 | 438 | 1968 | 3700 | 828 |
| 20 | 40 | 254 | 615 | 2715 | 3870 | 785 |
| 30 | 40 | 274 | 715 | 3160 | 3935 | 753 |
| 45 | 40 | 280 | 778 | 3200 | 4050 | 743 |

From the data set forth in Table IV it is apparent that the preferred new class of rubber vulcanization accelerators possess particularly desirable accelerating properties, when employed in conjunction with a basic organic nitrogen containing vulcanization accelerator as an activator thereof, thus forming a mixed accelerator.

As a further example showing the use of the preferred class of accelerators at the lower steam pressures, the following stock was compounded.

| | Parts |
|---|---|
| Pale crepe rubber | 100 |
| Sulfur | 2 |
| Zinc oxide | 5 |
| Whiting | 30 |
| Lithopone | 20 |
| Palm oil | 2 |
| The reaction product of phthalyl chloride and mercapto-benzo-thiazole | 0.66 |
| Diphenyl guanidine | 0.22 |

The above stock after curing and testing was found to possess the following modulus and tensile characteristics.

*Table V*

| Cure time mins. | Lbs. steam pressure | Modulus of elasticity in lbs./in.² at elongations of— | | | Tensile at break in lbs./in.² | Ultimate elongation, per cent |
|---|---|---|---|---|---|---|
| | | 300% | 500% | 700% | | |
| 20 | 10 | 238 | 633 | 1675 | 2365 | 810 |
| 30 | 10 | 278 | 800 | 2110 | 2830 | 810 |
| 10 | 20 | 206 | 518 | 1350 | 1930 | 820 |
| 15 | 20 | 289 | 845 | 2250 | 2955 | 775 |
| 30 | 20 | 420 | 1210 | 3125 | 3640 | 760 |
| 45 | 20 | 440 | 1260 | 3290 | 3420 | 730 |

The preferred class of materials also show desirable accelerating properties at low steam pressures when incorporated in a gum stock. Thus a rubber stock was compounded in the usual manner comprising.

| | Parts |
|---|---|
| Pale crepe rubber | 100 |
| Zinc oxide | 8 |
| Sulfur | 2 |
| The reaction product of phthalyl chloride and mercapto-benzo-thiazole | 0.6 |
| Diphenyl guanidine | 0.4 |

The rubber stock thus formed was vulcanized and on testing the cured rubber product was found to possess the following modulus and tensile characteristics.

*Table VI*

| Cure time mins. | Lbs. steam pressure | Modulus of elasticity in lbs./in.² at elongations of— | | | Tensile at break in lbs./in.² | Ultimate elongation, per cent |
|---|---|---|---|---|---|---|
| | | 300% | 500% | 700% | | |
| 20 | 10 | 203 | 434 | 1500 | 2820 | 820 |
| 30 | 10 | 229 | 530 | 1985 | 3660 | 830 |
| 40 | 10 | 252 | 640 | 2465 | 3740 | 795 |
| 15 | 20 | 223 | 525 | 2050 | 3310 | 805 |
| 30 | 20 | 296 | 765 | 2380 | 4295 | 805 |

Other mercapto-aryl-thiazoles than mercapto-benzo-thiazole may be reacted with aromatic acid chlorides and employed as accelerators of the vulcanization process. Thus mercapto-tolyl-thiazole, mercapto-naphtho-thiazole; substituted benzo-thiazoles, such as chlor-mercapto-benzo-thiazole, amino mercapto-benzo-thiazole and the like may be reacted with phthalyl chloride, benzoyl chloride and analogous compounds of other aryl acid halides and the product so formed employed as an accelerator, preferably with but, if desired, without the addition of a basic organic nitrogen containing vulcanization accelerator as an activator thereof.

What is claimed is:

1. The process of producing vulcanized rubber which comprises heating rubber and sulfur in the presence of a vulcanization accelerator containing a reaction product of an aromatic acid halide and a mercapto-aryl-thiazole as a constituent thereof.

2. The process of producing vulcanized rubber which comprises heating rubber and sulfur in the presence of a vulcanization accelerator containing a reaction product of an aromatic acid chloride and a mercapto-aryl-thiazole as a constituent thereof.

3. The process of producing vulcanized rubber which comprises heating rubber and sulfur in the presence of a vulcanization accelerator containing a reaction product of an aromatic acid chloride and a mercapto-benzo-thiazole as a constituent thereof.

4. The process of producing vulcanizing rubber which comprises heating rubber and sulfur in the presence of a vulcanization accelerator containing a reaction product of phthalyl chloride and a mercapto-benzo-thiazole as a constituent thereof.

5. The process of producing vulcanized rubber which comprises heating rubber and sulfur in the presence of a vulcanization accelerator containing a reaction product of phthalyl chloride and the sodium salt of mercapto-benzo-thiazole as a constituent thereof.

6. The process of producing vulcanized rubber which comprises heating rubber and sulfur in the presence of a mixture of vulcanization accelerators said accelerators comprising a reaction product of an aromatic acid chloride and a mercapto-aryl-thiazole, and a basic organic nitrogen containing accelerating compound.

7. The process of producing vulcanized rubber which comprises heating rubber and sulfur in the presence of a mixture of vulcanization accelerators said accelerators comprising a reaction product of an aromatic acid chloride and a mercapto-benzo-thiazole, and a basic organic nitrogen containing accelerating compound.

8. The process of producing vulcanized rubber which comprises heating rubber and sulfur in the presence of a mixture of vulcanization accelerators said accelerators comprising a reaction product of an aromatic acid chloride and a mercapto-benzo-thiazole, and a secondary amine accelerating compound.

9. The process of producing vulcanized rubber which comprises heating rubber and sulfur in the presence of a mixture of vulcanization accelerators said accelerators comprising a reaction product of an aromatic acid chloride and a mercapto-benzo-thiazole, and an aryl substituted secondary amine accelerating compound.

10. The process of producing vulcanized rubber which comprises heating rubber and sulfur in the presence of a mixture of vulcanization accelerators said accelerators comprising a reaction product of an aromatic acid chloride and a mercapto-benzo-thiazole, and an aryl substituted guanidine.

11. The process of producing vulcanized rubber which comprises heating rubber and sulfur in the presence of a mixture of vulcanization accelerators said accelerators comprising a reaction product of an aromatic acid chloride and a mercapto-benzo-thiazole and diphenyl guanidine.

12. The process of producing vulcanized rubber which comprises heating rubber and sulfur in the presence of a a mixture of vulcanization accelerators said accelerators comprising a reaction product of phthalyl chloride and the sodium salt of mercapto-benzo-thiazole, and diphenyl guanidine.

13. The vulcanized rubber product prepared by heating rubber and sulfur in the presence of a vulcanization accelerator containing a reaction product of an aromatic acid halide and a mercapto-aryl-thiazole as a constituent thereof.

14. The vulcanized rubber product prepared by heating rubber and sulfur in the presence of a vulcanization accelerator containing a reaction product of an aromatic acid chloride and a mercapto-aryl-thiazole as a constituent thereof.

15. The vulcanized rubber product prepared by heating rubber and sulfur in the presence of a vulcanization accelerator containing a reaction product of an aromatic acid chloride and a mercapto-benzo-thiazole as a constituent thereof.

16. The vulcanized rubber product prepared by heating rubber and sulfur in the presence of a vulcanization accelerator containing a reaction product of phthalyl chloride and a mercapto-benzo-thiazole as a constituent thereof.

17. The vulcanized rubber product prepared by heating rubber and sulfur in the presence of a vulcanization accelerator containing a reaction product of phthalyl chloride and the sodium salt of mercapto-benzo-thiazole as a constituent thereof.

18. The vulcanized rubber product prepared by heating rubber and sulfur in the presence of a mixture of vulcanization accelerators, said accelerators comprising a reaction product of an aromatic acid chloride and a mercapto-aryl-thiazole, and a basic organic nitrogen containing accelerating compound.

19. The vulcanized rubber product prepared by heating rubber and sulfur in the presence of a mixture of vulcanization accelerators, said accelerators comprising a reaction product of an aromatic acid chloride, and a mercapto-benzo-thiazole and a basic organic nitrogen containing accelerating compound.

20. The vulcanized rubber product prepared by heating rubber and sulfur in the presence of a mixture of vulcanization accelerators, said accelerators comprising a reaction product of an aromatic acid chloride and a mercapto-benzo-thiazole, and a secondary amine accelerating compound.

21. The vulcanized rubber product prepared by heating rubber and sulfur in the presence of a mixture of vulcanization accelerators, said accelerators comprising a reaction product of an aromatic acid chloride and a mercapto-benzo-thiazole, and an aryl substituted secondary amine accelerating compound.

22. The vulcanized rubber product prepared by heating rubber and sulfur in the presence of a mixture of vulcanization accelerators, said accelerators comprising a reaction product of an aromatic acid chloride and a mercapto-benzo-thiazole, and an aryl substituted guanidine.

23. The vulcanized rubber product prepared by heating rubber and sulfur in the presence of a mixture of vulcanization accelerators, said accelerators comprising a reaction product of an aromatic acid chloride and a mercapto-benzo-thiazole, and diphenyl guanidine.

24. The vulcanized rubber product prepared by heating rubber and sulfur in the presence of a mixture of vulcanization accelerators, said accelerators comprising a reaction product of phthalyl chloride and the sodium salt of mercapto-benzo-thiazole and diphenyl guanidine.

25. A composition of matter comprising a reaction product of an aromatic acid halide and a mercapto-aryl-thiazole.

26. A composition of matter comprising a reaction product of an aromatic acid chloride and a mercapto-benzo-thiazole.

27. A composition of matter comprising a reaction product of an aromatic acid chloride containing a single benzene nucleus and a mercapto-benzo-thiazole.

28. A composition of matter comprising a reaction product of phthalyl chloride and a mercapto-benzo-thiazole.

29. A composition of matter comprising a reaction product of phthalyl chloride and the sodium salt of mercapto-benzo-thiazole.

30. A method of treating rubber which comprises adding to the rubber, prior to vulcanization, a compound obtainable by condensing mercaptobenzothiazole with benzoyl chloride in the presence of a dilute caustic soda solution, and then vulcanizing.

31. A method of treating rubber which comprises adding to the rubber, prior to vulcanization, a diarylguanidine accelerator and a compound having the following probable formula:

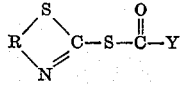

in which R is an aromatic nucleus attached by two of its adjacent positions and Y is an aromatic nucleus, and then vulcanizing.

32. A method of treating rubber which comprises adding to the rubber, prior to vulcanization, a compound obtainable by condensing an aryl mercapto thiazole with an aromatic acyl halide and then vulcanizing.

33. A method of accelerating the vulcanization of rubber which comprises vulcanizing in the presence of a compound having the formula

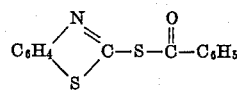

34. A compound possessing the formula

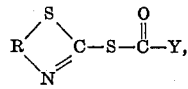

in which R is an aromatic nucleus attached by two of its adjacent positions and Y is an aromatic nucleus.

35. A compound possessing the formula

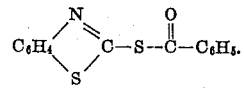

ROBERT L. SIBLEY.